(12) United States Patent
Durham et al.

(10) Patent No.: US 6,286,040 B1
(45) Date of Patent: *Sep. 4, 2001

(54) USER-FRIENDLY INTERFACE FOR SETTING EXPRESSIONS ON AN SNMP AGENT

(75) Inventors: Sandra Durham, Campbell; Ramanathan Kavasseri, Santa Clara, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/564,455

(22) Filed: May 3, 2000

Related U.S. Application Data

(63) Continuation of application No. 09/071,821, filed on May 1, 1998, now Pat. No. 6,085,237.

(51) Int. Cl.[7] .................................................. G06F 15/177
(52) U.S. Cl. ............................................................. 709/221
(58) Field of Search ..................................... 709/200, 201, 709/202, 206, 220, 221, 222, 223, 224

(56) References Cited

U.S. PATENT DOCUMENTS

| 5,715,394 | 2/1998 | Jabs .................................. | 395/200.11 |
| 5,812,529 | 9/1998 | Czarnik et al. ...................... | 370/245 |
| 5,968,116 | 10/1999 | Day, II et al. ....................... | 709/202 |
| 6,085,237 | 7/2000 | Durham et al. ...................... | 709/221 |

*Primary Examiner*—Moustafa M. Meky
(74) *Attorney, Agent, or Firm*—Thelen Reid & Priest LLP; David B. Ritchie

(57) ABSTRACT

Network communication between a management station and an expression management information base (MIB) on a simple network management protocol (SNMP) agent entails complex analysis and configuration during creation of the variables. In order to alleviate this concern, an interface is provided which accepts an expression from a user, parses the expression to determine if it is in proper form, creates SNMP set packets to set the expression on the expression MIB and sends the SNMP set packets to the expression MIB of the SNMP agent. Alternatively, a similar interface may be located within the SNMP agent or node, and requires no communication over the network in order to evaluate expressions.

44 Claims, 4 Drawing Sheets

USER-FRIENDLY INTERFACE FOR SETTING EXPRESSIONS ON AN SNMP AGENT

This application is a con't of Ser. No. 09/071,821 filed May 1, 1998, U.S. Pat. No. 6,085,237.

BACKGROUND OF THE INVENTION

1. Field of the Invention

The present invention relates to the field of computer networking. More particularly, the present invention relates to a user-friendly tool or interface for setting expressions via SNMP (Simple Network Management Protocol) on an SNMP agent having an expression management information base (MIB).

2. The Background Art

SNMP (Simple Network Management Protocol) is a protocol used in managing computer networks. It provides a systematic way of monitoring and managing a computer network and has become the standard in network management. The SNMP model of a managed network consists of four types of components: (1) managed nodes, (2) management stations, (3) management information, and (4) a management protocol. The managed nodes can be hosts, routers, bridges, printers, or any other devices capable of communicating status information to the management stations. Management stations monitor and manage the devices on the network. The management information contains information on the components of the network and the management protocol is the format in which this information is communicated to the management system.

FIG. 1 is a block diagram which illustrates an example of a network utilizing the SNMP model. Management station 10 controls a plurality of nodes 12a, 12b, 12c which in the figure include two computers 18a, 18b at nodes 12a, 12b respectively, and a printer 20 at node 12c. In order for an SNMP management station 10 to manage a node directly, the node must be able to run an SNMP agent, which is an SNMP management process normally encoded in software (although a hardware implementation for use with certain nodes is also possible). Almost all computers meet this requirement, as well as some bridges, routers, printers, and similar peripheral devices which are specifically designed for use in a network. In FIG. 1, the agents 14a, 14b running on each of the computers 20a, 20b respectively, would most likely be encoded in software whereas the agent 14c for the printer 20 would most likely be a hardware implementation.

Many networks contain components manufactured by several different companies. In order for the management station to communicate effectively with these varied devices, the nature of the information maintained by the agents must be rigidly specified. SNMP therefore describes the exact information each agent must maintain and the format in which it must be maintained in data structures called management information bases (MIB).

Each SNMP agent maintains a local database of variables that may describe the current and past state of the node to which it is assigned as well as provides instructions to affect the operation of the node. The management of the network is then carried out by the management stations. The management stations have one or more processes that communicate with the SNMP agents through the network by issuing commands and getting responses. One of the advantages of this design is that much of the complexity of the system is located in the management stations, rather than in the SNMP agents, allowing the agents to be as simple as possible to minimize their effect on the nodes on which they are running.

In the SNMP protocol, each SNMP agent may maintain one or more variables that describe the node's state. These variables are also called objects. Related managed objects are grouped together in a data structure called a management information base (MIB). FIG. 2 illustrates two different examples of SNMP agents. The first agent 30 contains a management information base 32. It is also possible to have multiple management information bases within each agent, as seen in the second agent 40, which contains management information bases 36 and 38. In addition, each node on the network may have different types of management information bases. Referring to FIG. 2, the first agent 30 contains both a MIB 32 and an expression MIB 34. An expression MIB is a special type of MIB which is discussed below. The second agent 34 also contains an expression MIB 42 as well as management information bases 36, 38.

The management station communicates with the agents over the network using the SNMP protocol, which allows the management station to query the state of the agent's local objects and modify them if necessary. Therefore, the management station communicates with the management information bases of each agent. There are four SNMP operations defined in version 1 of SNMP. These are "Get", "Get-next", "Set", and "Trap". "Get" retrieves an object instance from the agent. "Get-next" retrieves the next object instance from a table or list within an agent. "Set" sets object instances within an agent and "Trap" informs asynchronously the network management station of some event.

SNMP messages contain two parts: a message header and a protocol data unit. The message header comprises a version number and a community name. The community name serves to define an access environment for a set of network management stations using the community name. Additionally, since devices that do not know the proper community name are precluded from SNMP operations, network managers may also use the community name as a weak form of authentication.

The data portion of an SNMP message contains the specified SNMP operation ("Get", "Get-next", "Set", or "Trap") as well as associated data. FIG. 3 depicts the format for the data, or protocol data unit, portion. The format for a "Get", "Get-next", or "Set" command 50 includes four fields. The first is a request-ID field 52, which associates requests with responses. The next is an error status field 54, which indicates an error and an error type. The next is an error index field 56, which associates the error with a particular variable in the variable bindings. The last is a variable bindings field 58, which comprises the data. Each variable binding associates a particular variable with its current value (except in "Get" and "get-next" requests, where the value is ignored).

The format for a "Trap" command 66 includes six fields. The first is an enterprise field 62, which identifies the type of the object generating the trap. The next is an agent address field 64, which provides the address of the object generating the trap. The next is a generic trap type field 66, which provides the generic trap type. The next field is a specific trap type code 68, which provides the specific trap type. The next field is a time stamp field 70, which provides the amount of time that has elapsed between the last network reinitialization and generation of this trap. The last field is the variable bindings field 72, which provides a list of variables containing interesting information about the trap.

Version 2 of SNMP introduced two new operations: "Inform" and "Get-bulk". "Inform" allows one manager to send trap type information to another manager and request a response. "Get-bulk" allows a manager to retrieve efficiently large blocks of data, such as multiple rows in a table, which would otherwise require the transmission of many small blocks of data. The message format for the data portion of SNMP version 2 commands is depicted in FIG. 4. For "Get", "Get-next", "Inform", "Set", and "Trap" functions, the format 80 comprises five fields. The first field is a PDU type field 82, which identifies the PDU type (get, get-next, etc.). The second field is a request ID field 84, which associates requests with responses. The third field is an error status field 86, which indicates an error and an error type. The fourth field is an error index field 88, which associates the error with a particular variable in the variable bindings. The fifth field is a variable bindings field 90, which associates particular variables with their current values (except for the get and get-next requests, which ignore this value).

For the "Get-bulk" operation, the format 92 includes five fields. The first and second fields are PDU type 94 and request ID 96, respectively, and perform the same functions as in the "Get", "Get-next", "Inform", "Set", and "Trap" format. The third field is a nonrepeaters field 98, which specifies the number of variables in the variable bindings list for which a single lexicographic successor is to be returned. The fourth field is a max-repetitions field 100, which specifies the number of lexicographic successors to be returned for the remaining variables in the variable bindings list. The last field is the variable bindings field 104, which performs the same functions as in the "Get", "Get-next", "Inform", "Set", and "Trap" format.

There are a great number of different possible management information base types in version 2 of SNMP. One type is known as an expression MIB. It is sometime advantageous for a management station to evaluate expressions of the variables contained in the management information bases of each agent. This is generally done for testing purposes to ensure that the network is running properly. For example, a MIB may contain variable A and variable B. In order to test for a certain property it may be necessary to check whether A+B exceeds a certain preset number. For years, this would be performed by the management station occasionally polling and retrieving the MIB of the agent (via the SNMP protocol), receiving the values for A and B, then adding A+B and comparing the result to the preset number. In large systems, however, this frequent and repetitive polling increases network traffic to such an extent as to significantly decrease the overall efficiency of the system.

In order to alleviate this concern, expression management information bases were created. Like a normal MIB, an expression MIB is contained on an agent. However, an expression MIB contains variables which are evaluated expressions of variables contained in another MIB on that agent. The evaluated expressions may also contain constants. For example, a normal MIB on an agent may contain variables A and B. The expression MIB for that agent could then contain one or more variables representing A+B, A−B, A*B, A/B, AB/2, B+A+4 and the like.

In the above example, rather than polling for both A and B, the management station need only poll for the desired variable or variable which express the values it wishes to evaluate (for example, A+B). Evaluating these expressions on the SNMP agent reduces the network traffic as the management station does not have to poll for the individual values of the SNMP objects in the expression.

However, setting up an expression on an agent is cumbersome. In order for a management station to communicate with a node, the data must be split into SNMP set packets for transport. A simple expression like "1+2" can take eight or more separate SNMP set packets before the expression is completely defined. Also, the expressions must be converted from the user-friendly form into a special format that is easily parsable on the agent. The large number of pieces of information needed for each expression is required in order to keep the flexibility which is inherent in the expression MIB. The effect of maintaining this flexibility on the agent is that the complexity of parsing, defining, and verifying the accuracy of expression has been moved from the SNMP agent to the management station or user.

Accordingly, it would be desirable to provide a tool or interface system to assist in parsing, defining, and verifying the accuracy of the expression of an expression MIB.

BRIEF DESCRIPTION OF THE INVENTION

Network communication between a management station and an expression management information base (MIB) on a simple network management protocol (SNMP) agent entails complex analysis and configuration during creation of the variables. In order to alleviate this concern, an interface is provided which accepts an expression from a user, parses the expression to determine if it is in proper form, creates SNMP set packets to set the expression on the expression MIB and sends the SNMP set packets to the expression MIB of the SNMP agent. Alternatively, a similar interface may be located within the SNMP agent or node, and requires no communication over the network in order to evaluate expressions.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

According to a presently preferred embodiment of the present invention, the complexity of parsing, defining, and verifying the expressions may be handled by an interface running on a front-end machine. This interface allows the user to input expressions in a high level, or user-friendly, format. These expressions may then be parsed and transferred from the high level format by the interface for eventual evaluation of the expression on the SNMP agent.

Figure 1:
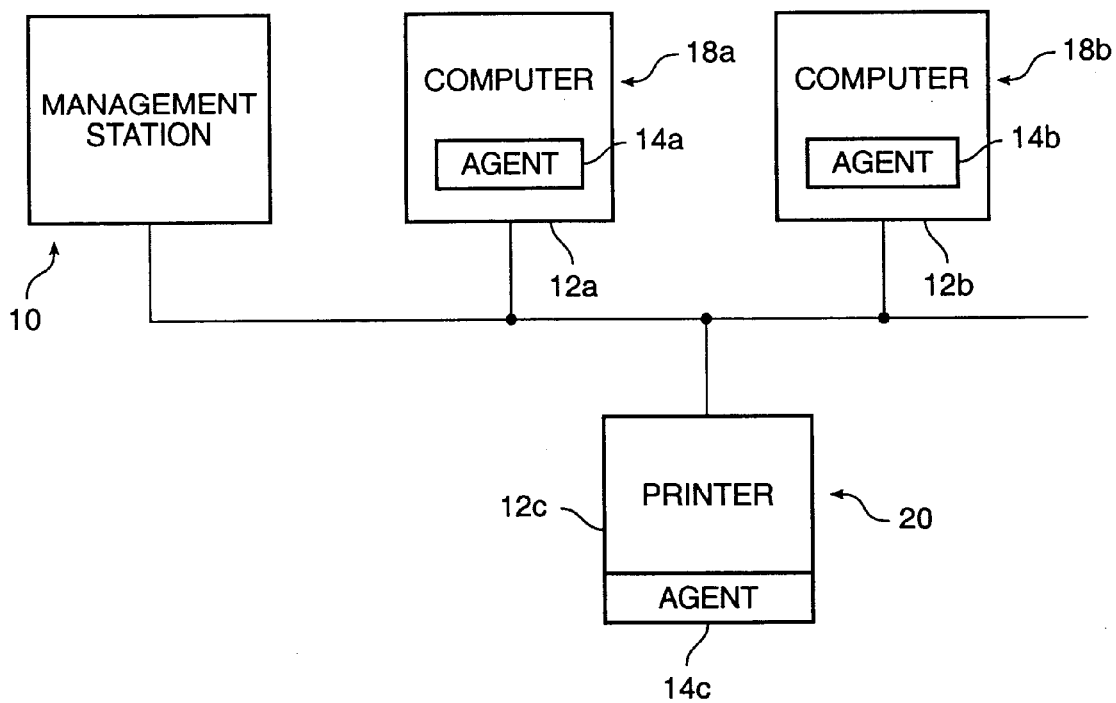
FIG. 1 depicts, in block diagram form, an example of a typical network running under the SNMP model.
Figure 2:
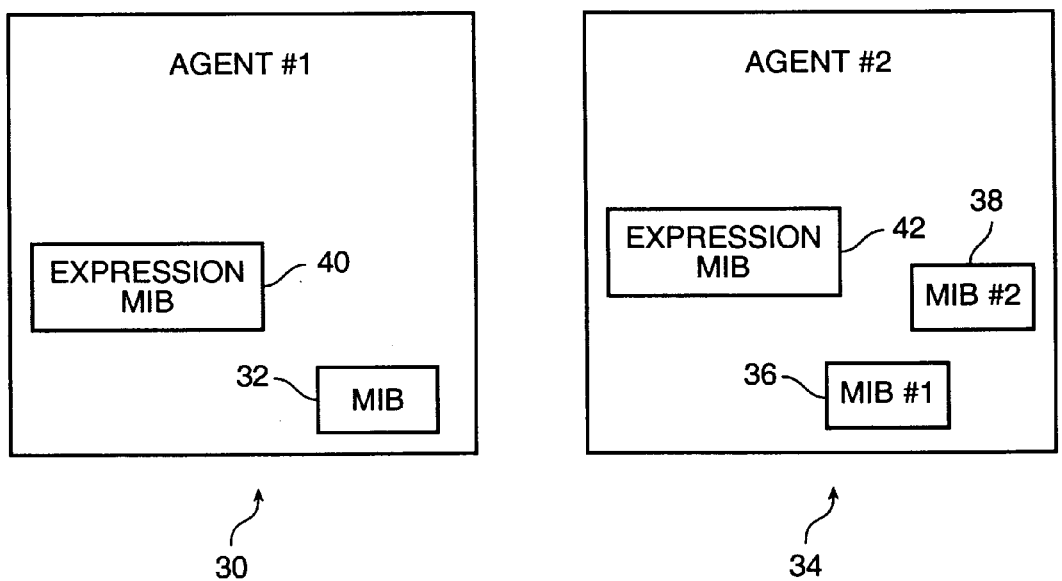
FIG. 2 depicts, in block diagram form, two examples of agents, each agent containing management information bases.
Figure 3:
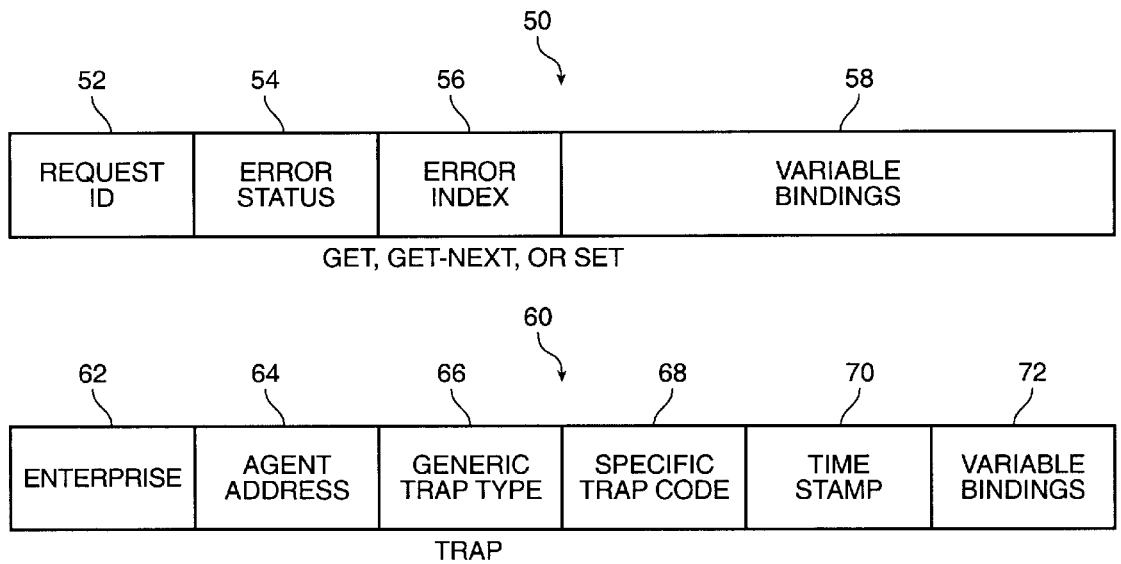
FIG. 3 is a diagram showing the format of SNMP version 1 protocol data units.
Figure 4:
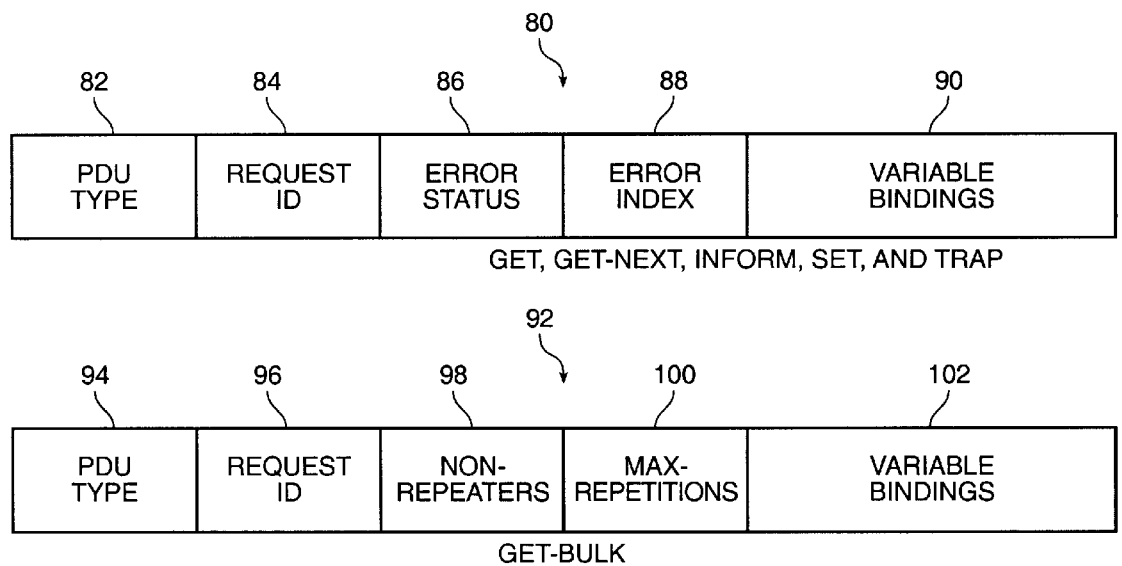
FIG. 4 is a diagram showing the format of SNMP version 2 protocol data units.
Figure 5:
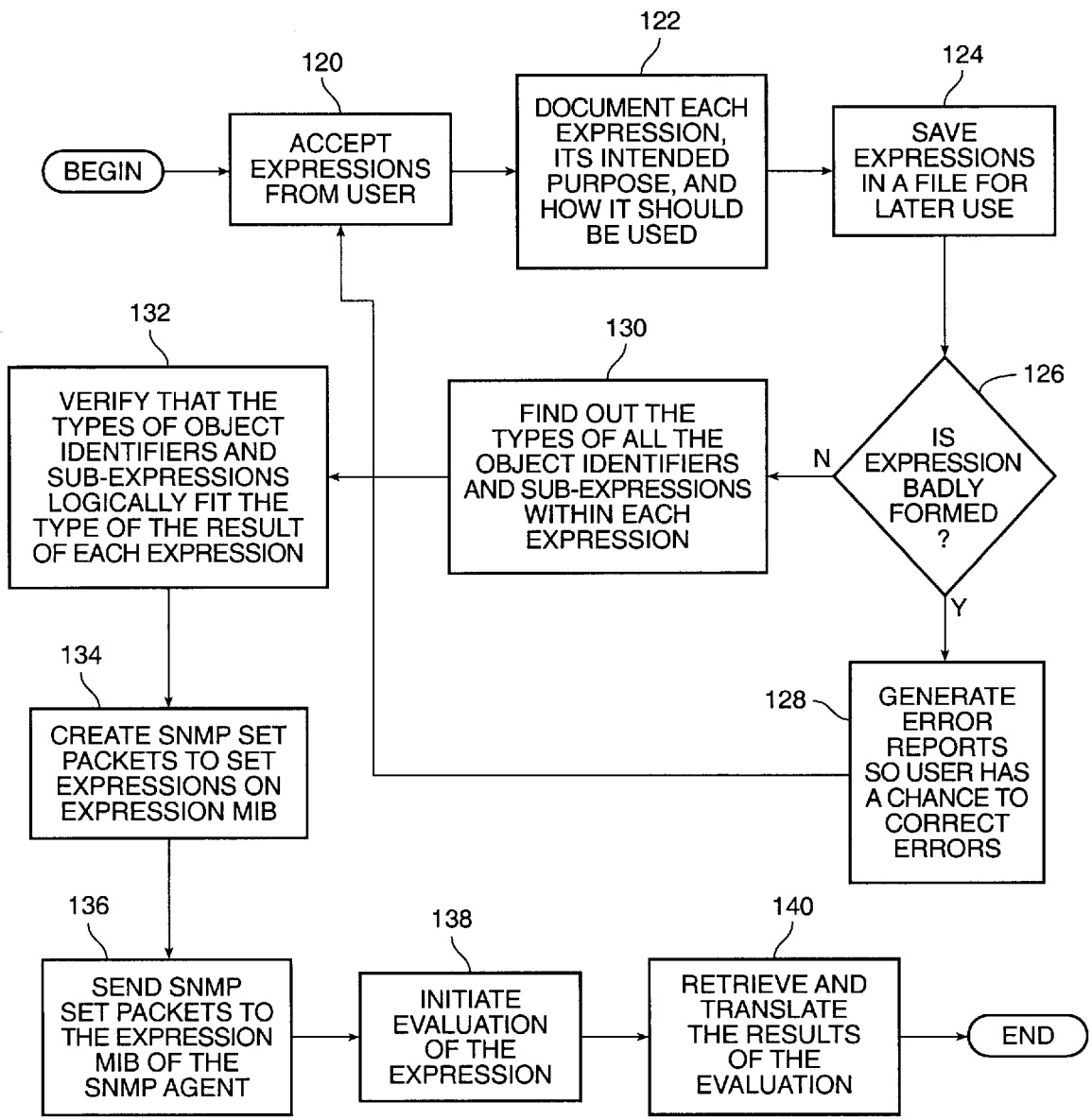
FIG. 5 is a diagram depicting the flow of the method utilized by an interface in accordance with a presently preferred embodiment of the present invention.

FIG. 5 depicts a method according to this presently preferred embodiment of the present invention. The method most likely will be performed by software, however a hardware implementation is also possible with the present invention. In addition, the method may be performed anywhere in the system. It is logical to have the management station performing the present method, but the present invention also covers an implementation where the method is performed by the agent, or by any other device on the network.

Referring to FIG. 5, the method begins at step 120 by accepting expressions from the user. These expressions would most likely be entered line by line, with one expression per line, as parsing such a format is much easier than parsing several expressions on a single line. The format, however, of the expressions is entirely flexible. Some examples of formats include infix, postfix and prefix expression formats, as well as C-language syntax, PERL-like syntax, and the like.

This user friendly interface may prompt the user for additional information until it has enough information to set the expressions on the agent. In addition, the present invention is not limited to an embodiment where the user must type in the expressions line-by-line, but rather it is conceivable that the user may wish to send all the information at once as a single file. The interface may be designed to handle whatever format the designer feels is best.

At step 122, the interface documents each expression, its intended purpose, and how it should be used. This step is entirely optional, but it is helpful when using the interface determines if the expressions are badly formed. The expressions may then be saved in a file for future use at step 124.

At step 126, the interface examines the expression to determine if it is badly formed. During this examination, the interface is parsing the expression. If at least one of the expressions is badly formed, the method moves to step 128 where an error report may be generated so that the user has a chance to correct the error before the process continues. This error report may take the form of an error message displayed on the screen of the front-end machine. Improper format can take on two forms. First, the expression may be syntactically incorrect. Second, the expression may be semantically incorrect. Either type of inaccuracy will cause errors to occur in the system, therefore it is preferable to examine both the syntactical and semantical accuracy of each expression before proceeding. When the expressions are properly formed, the method moves to step 130.

At step 130, the interface finds out the types of all of the object identifiers and sub-expressions within each expression. This step allows the interface to utilize the characteristics unique to the particular expression MIB and provides much improved verification of expressions and faster setting of the expression on the expression MIB. The types can then be verified against the type of the result of each expression at step 132. If they do not logically match the type of the result of each expression, then something has gone wrong. If they do match, the process can continue on to step 134. At step 134 the expressions are translated into SNMP set packets. These packets are then ready to be sent to the expression MIB of the appropriate agent at step 136. Steps 134 and 136 may be combined into a single step, whereby each SNMP set packet is sent to the expression MIB immediately after its creation, even before the next SNMP set packet is created. Additionally, if the interface is located on the agent or node, then steps 136 and 138 will be slightly altered in that they need not be passed over an SNMP network, although the variable (or objects) will likely be the same and these can be thought of as SNMP set packets even though they will not travel over an SNMP network. The evaluation of each expression is then initiated at step 136, where an SNMP get command will likely be executed for the variable the interface wishes to evaluate. At step 140, the interface may retrieve and translate the results of the evaluation.

Figure 6:
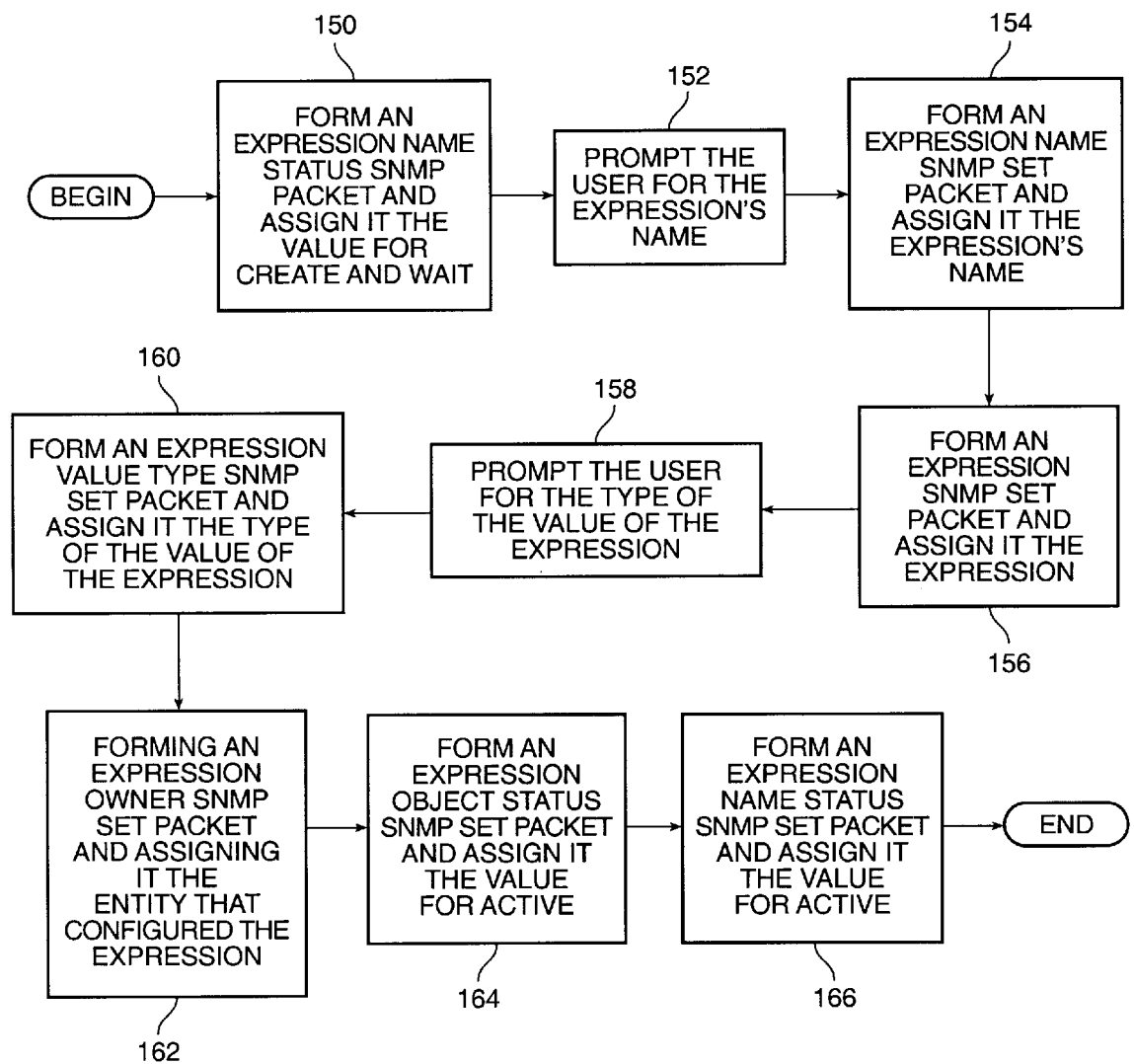
FIG. 6 is a diagram depicting the flow of the precise method used by the interface in creating SNMP set packets to set expressions on the expression MIB in accordance with a presently preferred embodiment of the present invention.

FIG. 6 depicts the specific sub-steps involved in the creation of the SNMP set packets.

At step 150, an expression name status SNMP set packet is formed and it is assigned the value for create and wait. In most expression MIBs, the precise name of the variable is expNameStatus. ExpNameStatus has six possible values: createAndGo, createAndWait, notready, notInService, active, and destroy. The purpose of setting this variable to createAndWait is to create an entry in the table in the expression MIB for the expression.

At step 152, the user may be prompted for the expression's name. This is an optional command but it may be useful for verification and identification purposes to have a name for each individual expression. At step 154, this expression name may be assigned to an expression name SNMP set packet. In most expression MIBs, the precise name of the variable is expName At step 156, an expression SNMP set packet is formed and it is assigned the expression. In most expression MIBs, the precise name of the variable is expExpression. The expression placed in the variable is in the same form as it was when it was input by the user. If the expression was in an improper form, it would have been corrected earlier in the process.

At step 158, the user may be prompted for the type of the value of the expression. This normally will take the form of an integer representing the type of the value of the expression. "1" represents counter32, "2" represents unsignedorgauge32, "3" represents timeTicks, "4" represents integer32, "5" represents ipAddress, "6" represents octetString, "7" represents objectId, and "8" represents counter64. At step 160, an expression value type SNMP set packet is formed and assigned the type of the value of the expression. In most expression MIBs, the precise name of the variable is expExpressionValueType.

At step 162, an expression owner SNMP set packet is formed and assigned the entity that configured the expression. In most cases, this may be as simple as putting the user's name in the variable (which may have been prompted for). The precise name of the variable in most systems is expExpressionOwner.

At step 164, an expression object status SNMP set packet is formed and assigned the value for active. Like the expression name status, the expression object status can have one of the following six values: createAndGo, createAndWait, notReady, notInService, active, and destroy. In most expression MIBs, the precise name of the variable is expObjectStatus.

At step 166, an expression name status SNMP set packet is formed (if it hasn't already) and assigned the value for active.

Optionally, there are several other variables that may be formed in SNMP set packets. These include expExpressionDeltaInterval, expExpressionPrefix, and expExpressionComment.

At each of these steps, there is a sub-process that may be used to set up each variable. This process includes forming an expression object status SNMP set packet, assigning it the value for create and wait, forming an object identifier SNMP set packet and assigning it the identification of the variable and forming an expression object identification wildcard SNMP set packet and setting it to true if the object identifier SNMP set packet is not fully qualified. Fully qualified means that the expression object identification is specified in its entirety. Not fully qualified, therefore, would mean that a portion (normally the exptension) of the expression object identification is not specified and the agent will have to attempt to walk through all of the possible extensions. Optionally, there are several other variables that may be set at this point as well, including expObjectSampleType, expObjectDeltaDiscontinuityID, expObjectDiscontinuityIDWildcard, expObjectDiscontinuityIDType, expObjectConditional, and expObjectConditionalWildcard.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for defining an expression on an expression MIB including:
   means for accepting the expression from a user;
   means for parsing said expression to determining if it is in proper form for an expression;
   means for creating SNMP set packets to set said expression on the expression MIB; and
   means for sending said SNMP set packets to the expression MIB of the SNMP agent.

2. The apparatus of claim 1, wherein said means for creating includes:
   means for forming an expression SNMP set packet and assigning it said expression.

3. The apparatus of claim 2, wherein said means for creating further includes:
   means for forming an expression name status SNMP set packet and assigning it the value for create and wait.

4. The apparatus of claim 2, wherein said means for creating further includes:
   means for forming an expression name SNMP set packet and assigning it the expression's name.

5. The apparatus of claim 4, further including:
   means for prompting the user for the expression's name.

6. The apparatus of claim 2, wherein said means for creating further includes:
   means for forming an expression value type SNMP set packet and assigning it the type of the value of the expression.

7. The apparatus of claim 6, further including:
   means for prompting the user for the type of the value of the expression.

8. The apparatus of claim 2, wherein said means for creating further includes:
   means for forming an expression owner SNMP set packet and assigning it the entity that configured the expression.

9. The apparatus of claim 2, wherein said means for creating further includes:
   for each variable to be formed, means for forming a object status SNMP set packet and assigning it the value for create and wait, means for forming an object identifier SNMP set packet and means for assigning it the identification of the variable and forming an expression object identification wildcard SNMP set packet and setting it to true if said object identifier SNMP set packet is not fully qualified.

10. The apparatus of claim 2, wherein said means for creating further includes:
    means for forming an expression object status SNMP set packet and assigning it the value for active.

11. The apparatus of claim 2, wherein said means for creating further includes:
    means for forming an expression name status SNMP set packet and assigning it the value for active.

12. The apparatus of claim 1, further including:
    means for documenting said expression, its intended purpose, and how it should be used.

13. The apparatus of claim 1, further including:
    means for saving said expression in a file for later use.

14. The apparatus of claim 1, further including:
    means for determining if said expression is badly formed and generating error reports if it is so that the user may correct errors.

15. The apparatus of claim 14, wherein said means for determining includes:
    means for determining if said expression is syntactically correct and generating error reports if it is not so that the user has a chance to correct errors.

16. The apparatus of claim 14, wherein said means for determining includes:
    means for determining if said expression is semantically correct and generating error reports if it is not so that the user has a chance to correct errors.

17. The apparatus of claim 1, further including:
    means for finding out the types of all the object identifiers and sub-expressions within said expression; and
    means for verifying that the types of the object identifiers and the sub-expressions logically fit the type of the result of said expression.

18. The apparatus of claim 17, wherein said means for finding out includes:
    means for finding out the types of all the object identifiers and sub-expressions within said expression by implicit inference using knowledge built into the interface.

19. The apparatus of claim 17, wherein said means for finding out includes:
    means for finding out the types of all the object identifiers and sub-expressions within said expression by accepting input from the user.

20. The apparatus of claim 17, wherein said means for verifying includes:
    means for verifying that the types of the object identifiers and the sub-expressions logically fit the type of the result of said expression, as defined by the expression MIB of the SNMP agent.

21. The apparatus of claim 1, further including:
    means for initiating evaluation of the expression on said agent.

22. The apparatus of claim 1, further including:
    means for retrieving and translating the results of said evaluation.

23. A program storage device readable by a machine, tangibly embodying a program of instructions executable by the machine to perform a method for defining an expression on an expression MIB, the method including the steps of:
    accepting the expression from a user;
    parsing said expression to determining if it is in proper form for an expression;

creating SNMP set packets to set said expression on the expression MIB; and sending said SNMP set packets to the expression MIB of the SNMP agent.

24. The program storage device of claim 23, wherein said creating step includes the step of:

forming an expression SNMP set packet and assigning it said expression.

25. The program storage device of claim 24, wherein said creating step further includes the step of:

forming an expression name status SNMP set packet and assigning it the value for create and wait.

26. The program storage device of claim 24, wherein said creating step further includes the step of:

forming an expression name SNMP set packet and assigning it the expression's name.

27. The program storage device of claim 26, wherein the method further includes the step of:

prompting the user for the expression's name.

28. The program storage device of claim 24, wherein said creating step further includes the step of:

forming an expression value type SNMP set packet and assigning it the type of the value of the expression.

29. The program storage device of claim 28, wherein the method further includes the step of:

prompting the user for the type of the value of the expression.

30. The program storage device of claim 24, wherein said creating step further includes the step of:

forming an expression owner SNMP set packet and assigning it the entity that configured the expression.

31. The program storage device of claim 24, wherein said creating step further includes the step of:

for each variable to be formed, forming a object status SNMP set packet and assigning it the value for create and wait, forming an object identifier SNMP set packet and assigning it the identification of the variable and forming an expression object identification wildcard SNMP set packet and setting it to true if said object identifier SNMP set packet is not fully qualified.

32. The program storage device of claim 24, wherein said creating step further includes the step of:

forming an expression object status SNMP set packet and assigning it the value for active.

33. The program storage device of claim 24, wherein said creating step further includes the step of:

forming an expression name status SNMP set packet and assigning it the value for active.

34. The program storage device of claim 23, wherein the method further includes the steps of:

documenting said expression, its intended purpose, and how it should be used.

35. The program storage device of claim 23, wherein the method further includes the step of:

saving said expression in a file for later use.

36. The program storage device of claim 23, wherein the method further includes the step of:

determining if said expression is badly formed and generating error reports if it is so that the user may correct errors.

37. The program storage device of claim 36, wherein said determining step includes the step of:

determining if said expression is syntactically correct and generating error reports if it is not so that the user has a chance to correct errors.

38. The program storage device of claim 36, wherein said determining step includes the step of:

determining if said expression is semantically correct and generating error reports if it is not so that the user has a chance to correct errors.

39. The program storage device of claim 23, wherein the method further includes the steps of:

finding out the types of all the object identifiers and sub-expressions within said expression; and verifying that the types of the object identifiers and the sub-expressions logically fit the type of the result of said expression.

40. The program storage device of claim 39, wherein said finding out step includes the step of:

finding out the types of all the object identifiers and sub-expressions within said expression by implicit inference using knowledge built into the interface.

41. The program storage device of claim 39, wherein said finding out step includes the step of:

finding out the types of all the object identifiers and sub-expressions within said expression by accepting input from the user.

42. The program storage device of claim 39, wherein said verifying step includes the step of:

verifying that the types of the object identifiers and the sub-expressions logically fit the type of the result of said expression, as defined by the expression MIB of the SNMP agent.

43. The program storage device of claim 23, wherein the method further includes the step of:

initiating evaluation of the expression on said agent.

44. The program storage device of claim 23, wherein the method further includes the step of:

retrieving and translating the results of said evaluation.

* * * * *

UNITED STATES PATENT AND TRADEMARK OFFICE
CERTIFICATE OF CORRECTION

PATENT NO.    : 6,286,040 B1
DATED         : September 4, 2001
INVENTOR(S)   : Durham et al.

It is certified that error appears in the above-identified patent and that said Letters Patent is hereby corrected as shown below:

Column 7,
Line 6, delete "exptension" and insert -- extension --.
Lines 22-23, delete "an expression on an SNMP agent having expression MIB" and insert -- an expression on an expression MIB --.

Signed and Sealed this

Second Day of July, 2002

*Attest:*

*Attesting Officer*

JAMES E. ROGAN
*Director of the United States Patent and Trademark Office*